United States Patent
Incesu et al.

(10) Patent No.: US 11,204,279 B2
(45) Date of Patent: Dec. 21, 2021

(54) APPARATUS AND METHOD

(71) Applicant: Sony Semiconductor Solutions Corporation, Kanagawa (JP)

(72) Inventors: Yalcin Incesu, Stuttgart (DE); Alexander Gatto, Stuttgart (DE)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 4 days.

(21) Appl. No.: 16/955,792

(22) PCT Filed: Dec. 21, 2018

(86) PCT No.: PCT/EP2018/086783
§ 371 (c)(1),
(2) Date: Jun. 19, 2020

(87) PCT Pub. No.: WO2019/122426
PCT Pub. Date: Jun. 27, 2019

(65) Prior Publication Data
US 2020/0333186 A1 Oct. 22, 2020

(30) Foreign Application Priority Data

Dec. 21, 2017 (EP) ..................................... 17209808

(51) Int. Cl.
*G01J 3/28* (2006.01)
*G01J 3/02* (2006.01)
(Continued)

(52) U.S. Cl.
CPC ........... *G01J 3/2823* (2013.01); *G01J 3/0208* (2013.01); *G01J 3/26* (2013.01); *G01J 3/28* (2013.01);
(Continued)

(58) Field of Classification Search
None
See application file for complete search history.

(56) References Cited

U.S. PATENT DOCUMENTS 9,041,932 B2 5/2015 Priore et al.
9,347,831 B2 5/2016 Funamoto
(Continued)

FOREIGN PATENT DOCUMENTS

WO 2012/040466 A2 3/2012
WO 2017/017684 A1 2/2017

OTHER PUBLICATIONS

11. Moeys, Diederik Paul, et al. "Color temporal contrast sensitivity in dynamic vision sensors." 2017 IEEE International Symposium on Circuits and Systems (ISCAS). IEEE, 2017 (Year: 2017).*
(Continued)

*Primary Examiner* — Shawn Decenzo
(74) *Attorney, Agent, or Firm* — Xsensus LLP (57) ABSTRACT

An apparatus comprising a spectral filter (26) with a variable spectral filter transmission (FT(λ)); an event-based imaging sensor (27) configured to produce measurement events ($y_1, y_2, \ldots, y_n$) which correspond to a change in a filter response (Y(t)) that is generated by an observed spectrum (X(λ)), and a processor (28) configured to control the filter transmission (FT(λ)) of the spectral filter (26) so that it sweeps over wavelength (λ) with time (t), and to generate an estimation (X*(λ)) of the observed spectrum (X(λ)) based on the measurement events ($y_1, y_2, \ldots, y_n$) that correspond to the filter response (Y(t)) and based on the filter transmission (FT(λ)).

15 Claims, 7 Drawing Sheets

(51) Int. Cl.
  *G01J 3/26* (2006.01)
  *G01J 3/32* (2006.01)
  *G01J 3/12* (2006.01)
(52) U.S. Cl.
  CPC .............. *G01J 3/2803* (2013.01); *G01J 3/32* (2013.01); *G01J 2003/1213* (2013.01); *G01J 2003/2826* (2013.01)

(56) References Cited

U.S. PATENT DOCUMENTS

| | | | |
|---|---|---|---|
| 9,588,099 | B2 | 3/2017 | Levenson et al. |
| 10,955,654 | B2* | 3/2021 | Chenegros ............. G01N 21/53 |
| 2014/0134712 | A1* | 5/2014 | Na .................... G01N 21/7746 |
| | | | 435/288.7 |
| 2018/0024343 | A1* | 1/2018 | Chenegros ............. G01N 21/53 |
| | | | 600/479 |

OTHER PUBLICATIONS

International Search Report and Written Opinion dated May 8, 2019 for PCT/EP2018/086783 filed on Dec. 21, 2018, 11 pages.

* cited by examiner

APPARATUS AND METHOD

CROSS-REFERENCE TO RELATED APPLICATIONS

The present application is based on PCT filing PCT/EP2018/086783, filed Dec. 21, 2018, and claims priority to EP 17209808.9, filed Dec. 21, 2017, the entire contents of each are incorporated herein by reference.

TECHNICAL FIELD

The present disclosure generally pertains to the field of spectral imaging systems.

TECHNICAL BACKGROUND

Spectral imaging is a field of spectroscopy and of photography in which a complete spectrum or some spectral information is collected at respective locations in an image plane. Multispectral imaging measures light in a number of spectral bands. Hyperspectral imaging is a special case of spectral imaging where often hundreds of contiguous spectral bands are available. Multi-/hyperspectral image sensing is for example of high interest for material classification. It is important to obtain high spatial, temporal and spectral accurate measurements. The amount of data captured in such high precision systems is very high and requires a compression of data (e.g. a 16-bit full HD resolved image sampled from 400 nm to 800 nm at 1 nm steps would generate ~1.5 Gbyte data per single capture).

State-of-the art spectral imaging systems apply various approaches to acquire spectral image information. The most known technique is applying mosaicking on an image sensor (similar to normal imaging sensors where a red-green-blue, a so-called Bayer pattern is applied), where each image pixel is covered with a different type of color filter with a known spectral sensitivity. This approach reduces the spatial image accuracy depending on the number of color filters and provides a low spectral resolution capability. For recovering the spectral image information complex signal reconstruction methods must be applied. Other systems try utilizing globally changing color filters, but those systems suffer from a temporal sampling limitation of the sensor, the camera systems large form factor and face data bandwidth problems due to the high amount of acquired data.

SUMMARY

According to a first aspect the disclosure provides a spectral filter with a variable spectral filter transmission; an event-based imaging sensor configured to produce measurement events which correspond to a change in a filter response that is generated by an observed spectrum, and a processor configured to control the filter transmission of the spectral filter so that it sweeps over wavelength with time, and to generate an estimation of the observed spectrum based on the measurement events that correspond to the filter response and based on the filter transmission.

According to another aspect the disclosure provides a method, comprising producing measurement events which correspond to a change in a filter response of a spectral filter that is generated by an observed spectrum; controlling the filter transmission of the spectral filter so that it sweeps over wavelength with time; and generating an estimation of the observed spectrum based on the measurement events that correspond to the filter response and based on the filter transmission. Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

The embodiments described below provide an apparatus comprising a spectral filter with a variable spectral filter transmission; an event-based imaging sensor configured to produce measurement events which correspond to a change in a filter response that is generated by an observed spectrum, and a processor configured to control the filter transmission of the spectral filter so that it sweeps over wavelength with time, and to generate an estimation of the observed spectrum based on the measurement events that correspond to the filter response and based on the filter transmission.

For example, the processor may be configured to reconstruct the observed spectrum by generating the estimation of the observed spectrum. In this way, the processor may be configured to output a reconstructed spectral scene volume which contains image and spectral information of a spectral scene.

The processor may be configured to control the spectral filter transmission of the spectral filter so that it sweeps linearly or non-linearly over wavelength with time.

For example, the spectral filter transmission of the spectral filter may be controlled in such a way that a sensitivity maximum of the spectral filter transmission sweeps linearly or non-linearly over wavelength with time.

The processor may be configured to control the spectral filter transmission characteristic arbitrarily over time.

The event-based imaging sensor may be configured to record any intensity changes that result from changes in spectral filter transmission.

The event-based imaging sensor may be configured to register pixel intensity changes in an asynchronous way.

The event-based imaging sensor may be configured to create, from incidents on the imaging sensor, events that indicate an intensity increase or decrease.

The events may indicate an intensity increase or decrease of a predefined threshold. The threshold may be fixed or adaptively changed by the processor.

The processor may be configured to create the filter response from the detected events.

The processor may be configured to reconstruct the observed spectrum from the measured filter response by a numerical reconstruction method.

The numerical reconstruction method may be a Tikhonov regularization.

The numerical reconstruction method may be based on a matrix containing the known filter responses of the spectral filter. For example, an equation system can be set up with a combination of multiple measurements and solve the inverse problem with known methods, e.g. Tikhonov regularization.

In the numerical reconstruction method, a single event or a sum of events related to a measurement between a time interval may be formulated as a linear (or higher order) combination.

In an alternative embodiment, the numerical reconstruction method may be based on compressive sensing (CS) principles. For example, compressive sensing principles may be used in the control of the spectral filter and herewith also compressive sensing methods can be utilized for the reconstruction of the original signal.

The processor may for example be a digital signal processor (DSP), a computer, a desktop computer, a workstation, or the like. The processor may also be implemented in a laptop, a tablet computer, a smartphone or the like. Circuitry of the electronic device may include one or more processors, one or more microprocessors, dedicated circuits, logic circuits, a memory (RAM, ROM, or the like), a storage, output means (display, e.g. liquid crystal, (organic) light emitting diode, etc.), loud speaker, an interface (e.g. touch screen, a wireless interface such as Bluetooth, infra-red, audio interface, etc.), etc. The processor may be collocated with the event-based imaging sensor and/or the spectral filter, or it may be remote to the event-based imaging sensor and/or the spectral filter. For example, event-based imaging sensor, spectral filter and processor may be implemented in a single camera device. Alternatively, a camera device may only comprise the event-based imaging sensor and spectral filter, and the processor may be arranged remote from the event-based imaging sensor and may be arranged to receive the data produced by the event-based imaging sensor via a data communication path such as Ethernet, WLAN or the like.

The apparatus may further comprise a lens system and a band-limiting filter.

The embodiments also disclose a method, comprising producing measurement events which correspond to a filter response of a spectral filter that is generated by an observed spectrum; controlling the filter transmission of the spectral filter so that it sweeps over wavelength with time; and generating an estimation of the observed spectrum based on the measurement events that correspond to the filter response and based on the filter transmission.

Spectral Imaging

Figure 1:
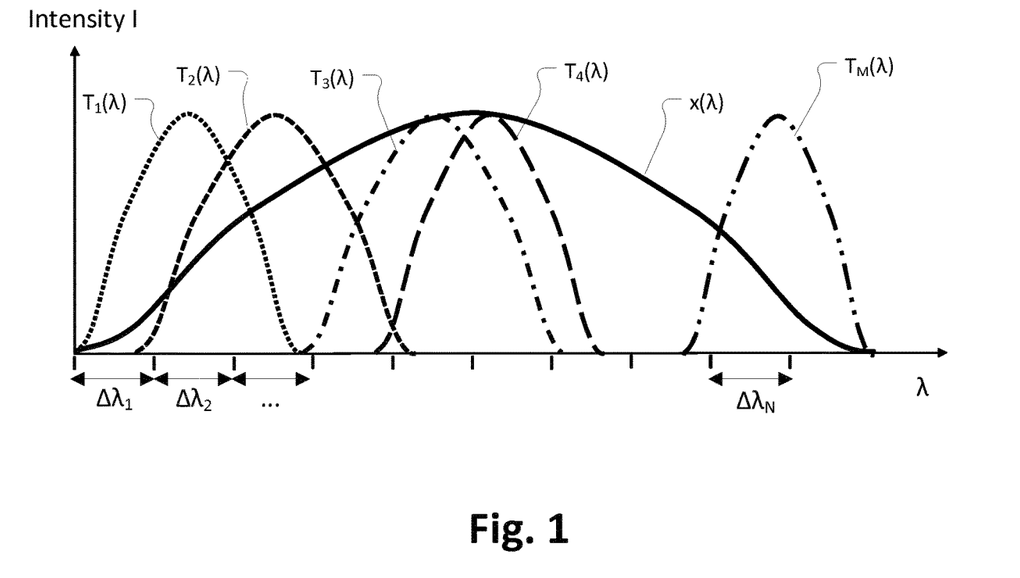
FIG. 1 schematically shows the processing in a traditional spectral imaging system.

FIG. 1 schematically shows the processing in a traditional spectral imaging system. In a traditional spectral imaging system an object spectrum $x(\lambda)$ is acquired with M different color filters $T_i(\lambda) | i \in \{1, 2, \ldots, M\}$ with varying spectral sensitivities. The filter response $Y(\lambda) = \{y_1, y_2, \ldots, y_m\}$ is basically the Fredholm integral of the observed object spectrum $x(\lambda)$ and the corresponding filter $T(\lambda)$:

$$y_i = \int x(\lambda) \cdot T_i(\lambda) d\lambda$$

For the purpose of processing, the spectrum is discretized into N wavelength bins $\Delta\lambda_1, \Delta\lambda_2, \ldots, \Delta\lambda_N$, and it is assumed, as a simplification, that there is one discrete intensity value $x_j$ associated with each wavelength bin $\Delta\lambda_j$ (the discrete intensity values $X(\lambda) = \{x_1, x_2, \ldots, x_N\}$ corresponding to the mean or median intensity in the respective frequency bin). Under this assumption, the Fredholm integral can be written as a matrix multiplication:

$$\begin{pmatrix} y_1 \\ y_2 \\ y_3 \\ \vdots \\ y_M \end{pmatrix} = \begin{pmatrix} T_{11} & T_{12} & T_{13} & & T_{1N} \\ T_{21} & T_{22} & T_{23} & \ldots & T_{2N} \\ T_{31} & T_{32} & T_{33} & & \\ & \vdots & & \ddots & \vdots \\ T_{M1} & & & \ldots & T_{MN} \end{pmatrix} \begin{pmatrix} x_1 \\ x_2 \\ x_3 \\ \\ x_N \end{pmatrix}$$

with the filter matrix $$T_{ij} = \int_{\Delta\lambda_j} T_i(\lambda) d\lambda$$

computed from the filters $T_i(\lambda)$, which are known.

The above mathematical relation between observed spectrum $X(\lambda)$ and filter response $Y(\lambda)$ allows to reconstruct the original spectrum $x(\lambda)$ from the measured filter responses $Y(\lambda)$ by numerical reconstruction methods, for example by using ordinary least squares linear regression to minimize $\|Ax-b\|^2$ (where A corresponds to the matrix T of filter responses $T_{ij}$, and b corresponds to the vector of filter responses $Y(\lambda)$), or by using e.g. Tikhonov regularization. In Tikhonov regularization a regularization term $\|\Gamma x\|^2$ is introduced into the minimization problem:

$$\|Ax-b\|^2 + \|\Gamma x\|^2$$

where $\|.\|^2$ is the Euclidian norm, and $\Gamma$ is some suitable chosen Tikhonov matrix (e.g. $\Gamma = \alpha B$ with a suitable chosen scalar $\alpha$ and a suitable chosen matrix B).

An explicit solution of the minimization problem, denoted by $\hat{x}$, is given by:

$$\hat{x} = (A^T A + \Gamma^T \Gamma)^{-1} A^T b = (A^T A + \alpha^2 B^T B)^{-1} A^T b.$$

The regularization matrix B may for example be chosen as the identity matrix I, or e.g. as follows:

$$B = \begin{bmatrix} 1 & 0 & \ldots \\ -1 & 1 & \ldots \\ \ddots & \ddots & \ddots \end{bmatrix}$$

Compressive Event-Based Spectrum Imaging System

Figure 2:
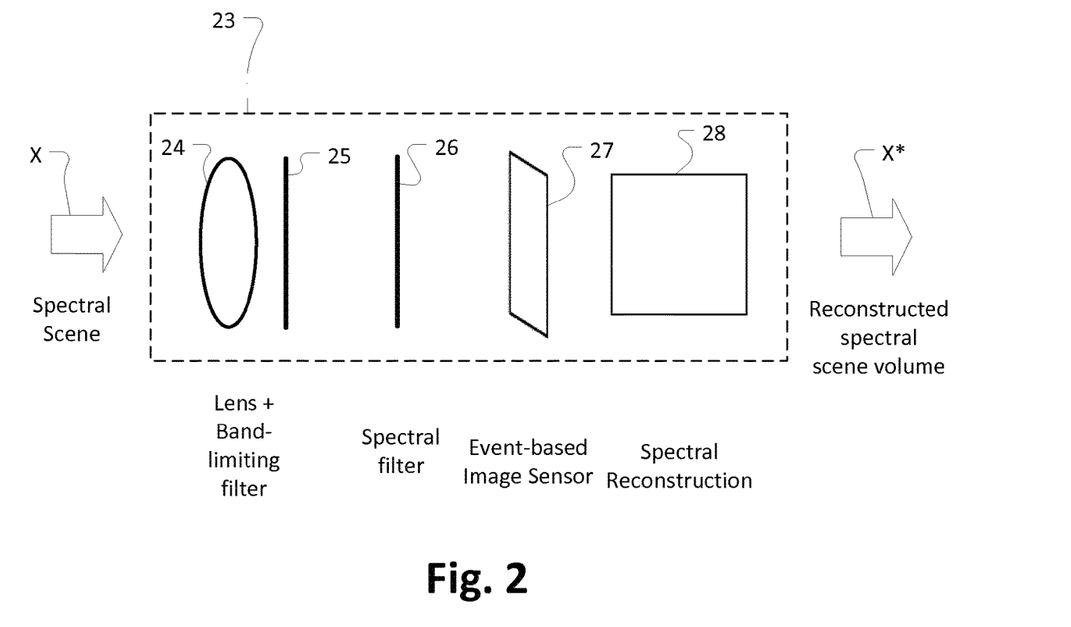
FIG. 2 schematically shows an embodiment of a compressive event-based spectral imaging system.

FIG. 2 schematically shows an embodiment of a compressive event-based spectral imaging system. The light emitted or reflected by an object represents a spectral scene 21, which is captured by the event-based spectrum imaging system 23. The event-based spectrum imaging system 23 according to this embodiment comprises a lens system 24 including a band-limiting filter 25, a spectral filter 26, an event based image sensor 27, and a signal processor 28 for generating a reconstruction 22 of the spectral scene. The band-limiting filter 25 is provided to ensure that the spectral information of interest is captured and to suppress unwanted spectral information. The spectral filter 26 has a known and globally controllable variable filter transmission FT over time. The spectral filter 26 may for example be a "Varispec"™ tunable filter. The spectral filter transmission over time FT(t) is correlated to a spectral filter sensitivity over the wavelength FT(k). The gradient (dynamic behaviour over wavelength/time) of the filter domninantly determines the resolution of the acquisition. The event-based image sensor 27 registers asynchronously pixel intensity changes. The event-based image sensor 27 may for example be a "Dynamc Vision Sensor" (DVS) with high sensitivity and dynamic range which provides very fast sampling with lower than 10 µs. The signal processor 28 is configured to reconstruct, based on knowledge of the components 24, 25, 26 and 27, the spectral scene 21. The output of signal processor 28 is a reconstructed spectral scene volume 22, which contains image and spectral information of the spectral scene 21.

The compressive event-based spectral imaging system applies a high speed sweep over the filter's 26 spectral transmission FT($\lambda$), so that FT(t) becomes time-dependent, such that its transmission amplitude changes over time t. During the sweep the event-based imaging sensor 27 records any intensity changes that result from the changes in the filter transmission FT(t).

Figure 3:
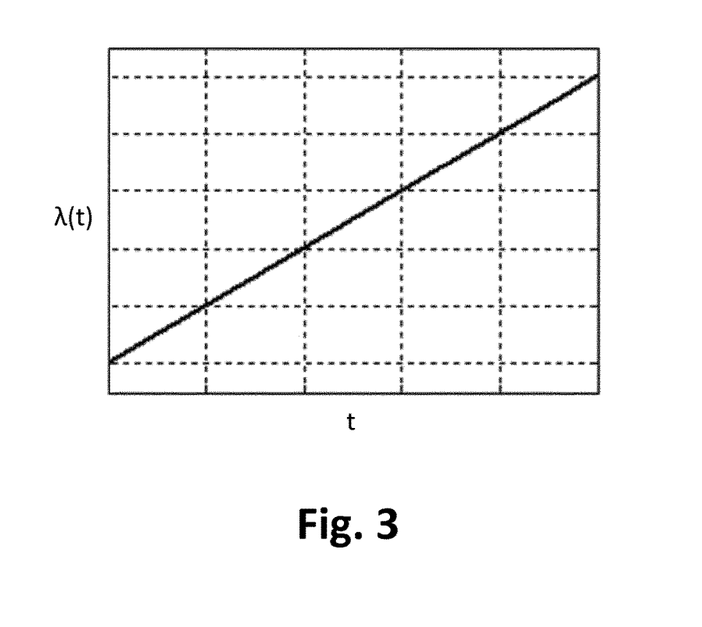
FIG. 3 schematically shows a sweep of the filter transmission FS(t)
Figure 4:
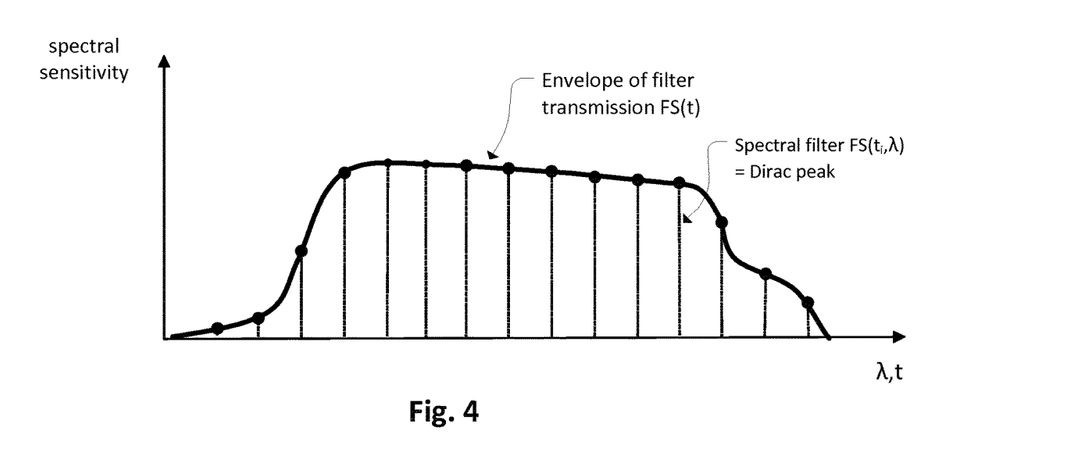
FIG. 4 shows an exemplifying effective filter transmission FT(t) over time t, respectively wavelength $\lambda$, in the case in which the filter transmission would be a series of Dirac impulses having different transmission amplitudes for different wavelengths as shown in FIG. 3.

FIG. 3 schematically shows a sweep of the filter transmission FT(t). In order to demonstrate the principle in a simplified way, it is assumed that the filter transmission is a series of Dirac impulses having different transmission amplitudes for different wavelengths. That is, at each instance in time, the filter transmission is an ideal Dirac peak located at the wavelength $\lambda$(t) as shown in FIG. 4. According to the example of FIG. 4, there is a linear correspondence between time t and wavelength position $\lambda$(t) of the Dirac peak, so that the relation of wavelength $\lambda$(t) and time t corresponds to a ramp function.

FIG. 4 shows an exemplifying effective filter transmission FT(t) over time t, respectively wavelength $\lambda$, in the case in which the filter transmission would be a series of Dirac impulses having different transmission amplitudes for different wavelengths as shown in FIG. 3. According to this embodiment, the Dirac impulse of the filter transmission "sweeps" linearly over the wavelength with time t, so that there is a linear correspondence between time t and wavelength X.

Figure 5:
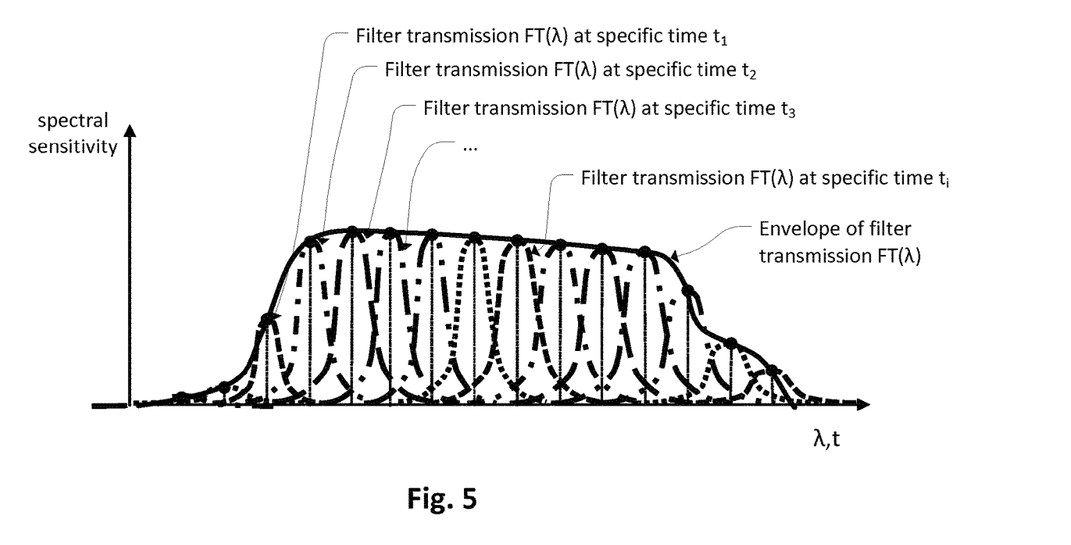
FIG. 5 schematically shows a more realistic behaviour of a filter transmission FT(t) over time t, respectively wavelength X.

FIG. 5 schematically shows a more realistic behaviour of a filter transmission FT(t) over time t, respectively wavelength $\lambda$. The filter transmission at each time t is modelled as a Gauss distribution centered at a centre wavelength that sweeps over the wavelengths $\lambda$ with time t. That is, the filter behaviour is broader than in the ideal case of the Dirac peak. Like in the example of FIG. 4, the filter behaviour of the spectral filter is varied over time. In the example here, the relation between centre wavelength and time follows a ramp function as described with regard to FIG. 3.

Figure 6:
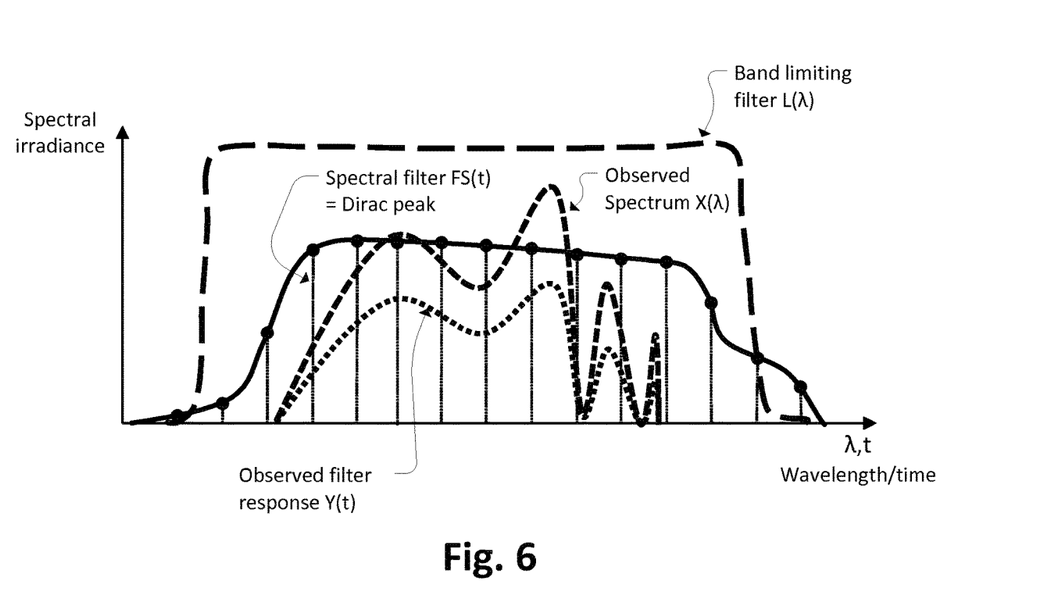
FIG. 6 schematically shows how the compressive event-based spectrum imaging system behaves in the presence of an incoming spectrum while the spectral filter is varied over time according to the case of FIG. 4.

FIG. 6 schematically shows how the compressive event-based spectrum imaging system behaves in the presence of an incoming spectrum while the spectral filter is varied over time. In the example here, the spectral filter transmission is varied as defined in the case of FIG. 4, i.e. with a spectral filter having an effective transmission over time and wavelengths that corresponds to a series of Dirac impulses having different transmission amplitudes for different wavelengths. After the band limiting filter L($\lambda$) and the lens the observed spectrum X($\lambda$) is considered to be stable over time (as the information is captured at very high speed). The observed spectrum X($\lambda$) hits the spectral filter FS(t). Here, the spectral filter FS(t) is idealized as an ideal tunable filter, i.e. as a sweeping Dirac response so that there is no need for an integral over $\lambda$. The device steps through the spectral sensitivity with a known driving mode. That is, it sweeps through the targeted wavelengths as described with regard to FIG. 4 above, e.g. linearly or non-linearly, and, at each time, creates an observed filter response Y(t). This observed filter response Y(t) creates incidents on the sensor and herewith events (see FIGS. 7a and b and corresponding description) that indicate an increase or decrease of a pre-defined threshold $\Delta$ (the threshold $\Delta$ can be fixed or adaptively changed by the spectral filter controlling unit).

Event-Driven Spectral Imaging

Figure 7A:
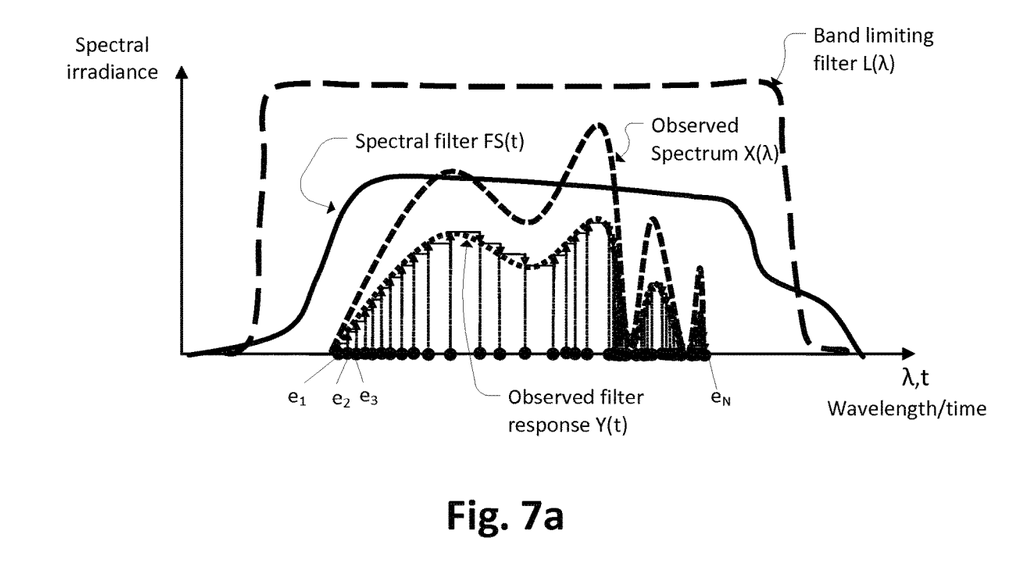
FIG. 7a schematically shows the principle of event-driven spectral imaging in the compressive event-based spectral imaging system.

FIG. 7a schematically shows the principle of event-driven spectral imaging in the compressive event-based spectral imaging system. Each time the amplitude of the observed filter response Y(t) changes by a predefined amount (see threshold $\Delta$ in FIG. 7b) the event-based imaging sensor generates a measurement event $e_1$, $e_2$, $e_3$, to $e_N$. From this series of measurement event $e_1$, $e_2$, $e_3$, to $e_N$, the observed filter response Y(t) can be reconstructed (e.g. by interpolation, or the like). From the observed filter response Y(t), the observed spectrum X($\lambda$) can be reconstructed as described below in more detail.

Figure 7B:
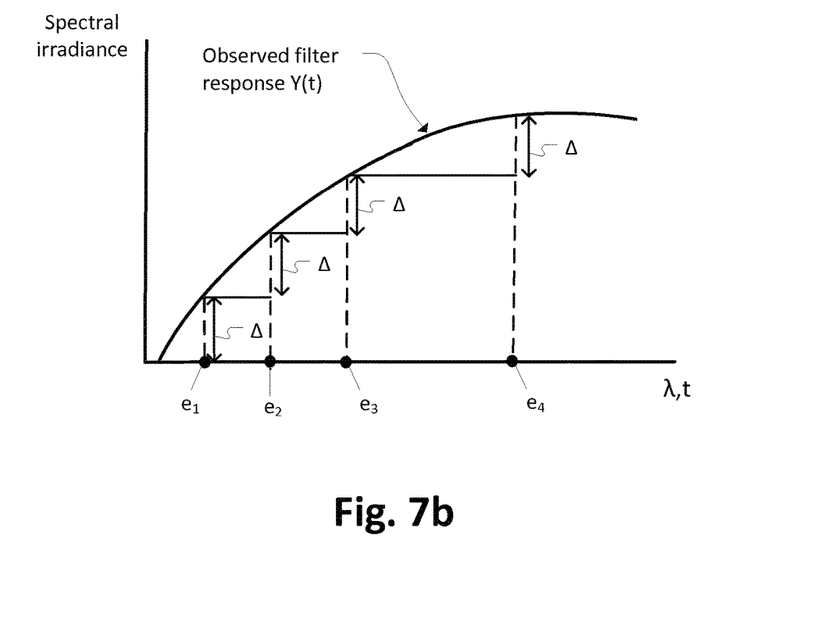
FIG. 7b schematically shows in more detail how the event-based imaging sensor generates a measurement events.

FIG. 7b schematically shows in more detail how the event-based imaging sensor generates measurement events. As shown in FIG. 7b, all events are separated by an equal sized threshold $\Delta$ along the spectral irradiance axis. Every time the signal processor 28 recognizes a spectral intensity change $\geq \Delta$ an event $e_i$ is recorded. That is, each time the amplitude of the observed filter response Y(t) changes by the predefined threshold $\Delta$, the event-based imaging sensor generates a measurement event, here measurement events $e_1$, $e_2$, $e_3$, $e_4$. The larger the amplitude change is, the more events are created per time unit. The density of the measurement events on the time axis represents the slope of the observed filter response Y(t) so that the observed filter response Y(t) can be reconstructed from the density of the measurement events by integration according to the principle described in FIG. 7b. For example, the first measurement event $e_1$ at time $t_1$ corresponds to Y($t_1$)=$\Delta$, the second measurement event $e_2$ at time $t_2$ corresponds to Y($t_2$)=2$\Delta$, the third measurement event $e_3$ at time $t_3$ corresponds to Y($t_3$)=3$\Delta$, the fourth measurement event $e_4$ at time $t_4$ corresponds to Y($t_4$)=4$\Delta$, and so on.

Linear interpolation may be applied on the set of measurements to obtain a smooth filter response Y(t). The filter response Y($\lambda$) as function of the wavelength $\lambda$ can be obtained by the known correspondence between time t and wavelength $\lambda$ as defined by the filter sweep (see e.g. FIG. 3).

Reconstructing the Observed Spectrum X($\lambda$)

As it is described with regard to FIGS. 7a, b above the spectral filter response Y($\lambda$) can be obtained by integrating the density of the measurement events $y_i$ to $y_N$ to obtain Y(t) and the known correspondence between time t and wavelength $\lambda$ as defined by the filter sweep.

That is, the observed filter response Y(t) can be expressed as a sum over all the events $e_i$ within the time interval $\{0, t\}$, where 0 indicates the start of the measurement $$Y(t) = \Delta \sum_{i | t_i \in \{0, t\}} e_i$$

Here the deliverable of the event sensor is a series of events $e_i$, each event being attributed a respective time stamp $t_i$ $$e_i = \begin{cases} 1 & \text{if } \left[ \int [FS(t_i) - FS(t_{i-1})] X(\lambda) d\lambda \right] = \Delta \\ -1 & \text{if } \left[ \int [FS(t_i) - FS(t_{i-1})] X(\lambda) d\lambda \right] = -\Delta \end{cases}$$

Here, $t_i$ is the time stamp of an event, and $t_{i-1}$ is the time stamp of a preceding event. $X(\lambda)$ is the observed spectrum.

In the case of an effective transmission as Dirac impulse (FIG. 4), time t is equivalent to $\lambda$ and $y_{i-1,i} = Y(t_i) - Y(t_{i-1})$ $y_{i-1,i} = [FS(t_i) - FS(t_{i-1})] \cdot x \cdot (t_i - t_{i-1})$.

and the originally observed spectrum $X(\lambda)$ can be estimated by dividing $Y(\lambda)$ with the spectral filter curve $FS(\lambda)$.

the measure $y_\Delta$ (a single or a sum of events related to a measurement between a sampling time interval of $[t_0, t_1]$) can be formulated for instance as a linear (or higher order) combination, e.g.

It is possible to solve the inverse problem with known methods, e.g. Tikhonov regularization. The solution of this inverse problem represents an estimation X* of the observed spectrum X.

Here, $FS(t_1)$ and $FS(t_0)$ are the filter transmissions FT, at time $t_1$ respectively $t_0$, which in the case of an effective transmission as Dirac impulse results in one sample at time $t_1$, respectively one sample at time $t_0$. The measurement $y_\Delta$ depends on the change of the filter response between to and $t_1$. That is, $y_\Delta$ is the sum of measurements between time samples $t_0$ and $t_1$. The sampling interval $[t_0, t_1]$ correlates with the dynamic range, sensitivity and threshold to detect the event on the sensor. It may be a predefined value depending on the sensor configuration. The amount of time intervals depends on the time it is swiped through FS.

For the more complicated case of a broader spectral filter behaviour (see FIG. 5, with widened effective transmission) or noisy data it is possible to formulate a linear equation system, for example using Tikhonov regularization, where the Matrix T contains the known filter responses of the spectral filter.

Figure 8:
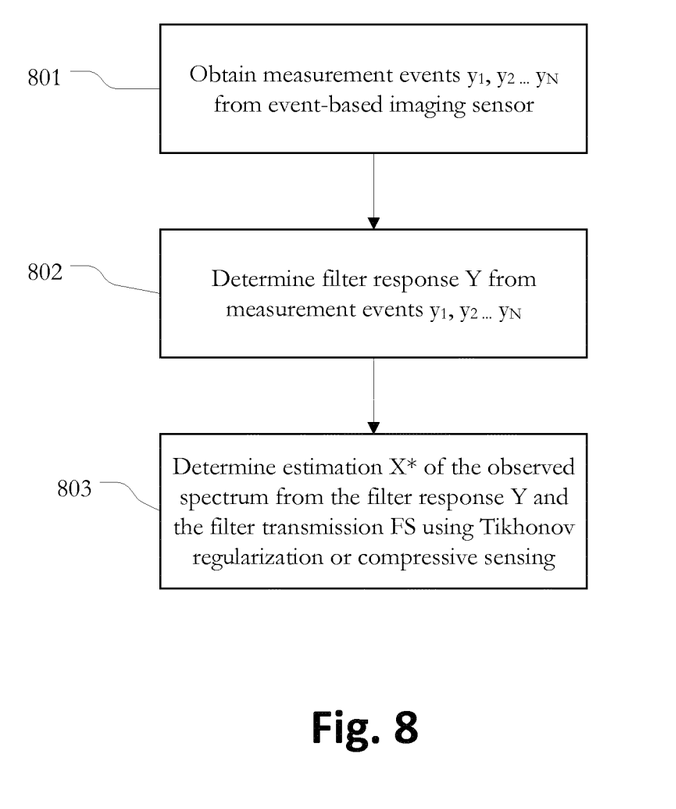
FIG. 8 shows a flowchart of an embodiment of processing event-based sensor data.

FIG. 8 shows a flowchart of an embodiment of processing event-based sensor data. At 801, measurement events $y_1, y_2 \ldots y_N$ are obtained from event-based imaging sensor. At 802, the filter response Y is determined from the measurement events $y_1, y_2 \ldots y_N$. At 803, X* is determined from the filter response Y using Tikhonov regularization.

Compressive Sensing (CS)

Another option is to utilize compressive sensing (CS) principles in the control of the spectral filter SF and herewith also CS methods can be utilized for the reconstruction of the original signal $X(\lambda)$.

Implementation

Figure 9:
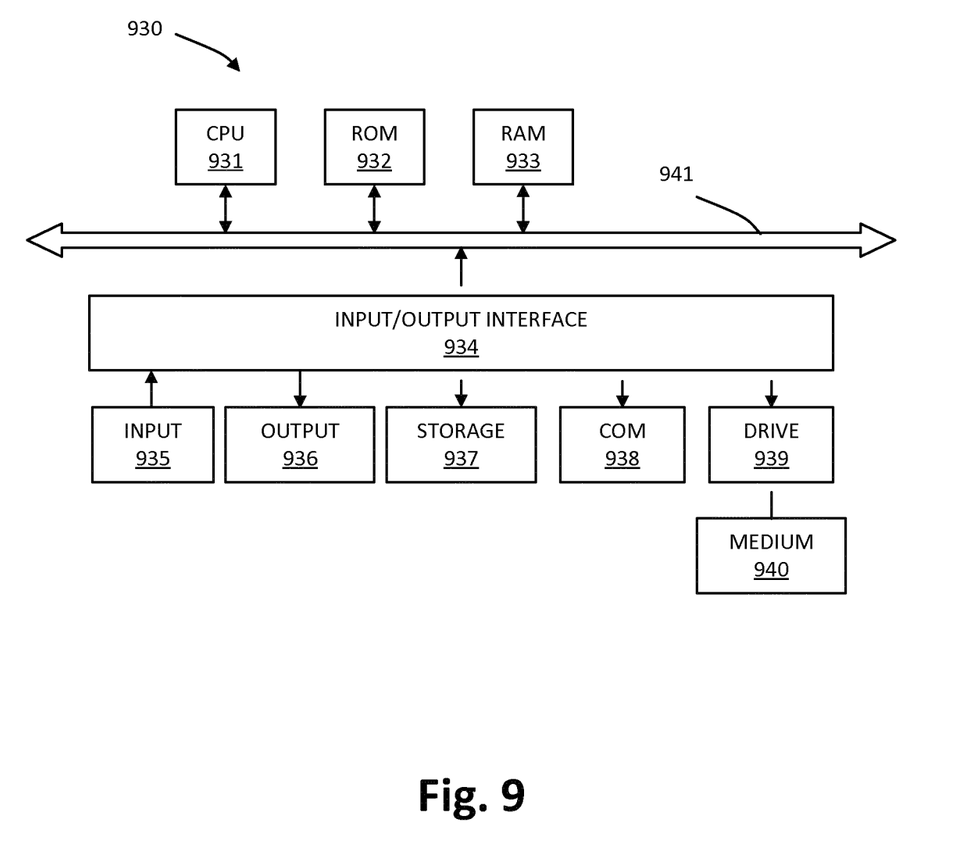
FIG. 9 shows an embodiment of an electronic device that may function as a processor.

In the following, an embodiment of an electronic device 930 is described under reference of FIG. 9. The electronic device, here a computer 930, can be implemented such that it can basically function as any type of image processing apparatus or image processing entity described herein. The computer has components 931 to 940, which can form a circuitry, such as any one of the circuitries of an image processing device.

Embodiments which use software, firmware, programs, plugins or the like for performing the processes as described herein can be installed on computer 930, which is then configured to be suitable for the embodiment.

The computer 930 has a CPU 931 (Central Processing Unit), which can execute various types of procedures and methods as described herein, for example, in accordance with programs stored in a read-only memory (ROM) 932, stored in a storage 937 and loaded into a random access memory (RAM) 933, stored on a medium 940, which can be inserted in a respective drive 939, etc.

The CPU 931, the ROM 932 and the RAM 933 are connected with a bus 941, which in turn is connected to an input/output interface 934. The number of CPUs, memories and storages is only exemplary, and the skilled person will appreciate that the computer 930 can be adapted and configured accordingly for meeting specific requirements which arise when it functions in an image processing apparatus or system.

At the input/output interface 934, several components are connected: an input 935, an output 936, the storage 837, a communication interface 938 and the drive 939, into which a medium 940 (compact disc, digital video disc, compact flash memory, or the like) can be inserted.

The input 935 can be a pointer device (mouse, graphic table, or the like), a keyboard, a microphone, a camera, a touchscreen, etc. and also the event-based image sensor 27 already described above.

The output 936 can have a display (liquid crystal display, cathode ray tube display, light emittance diode display, etc.), loudspeakers, etc. most commonly the output will be used to give out the calculated reconstructed spectral scene X* described in the embodiments above (see e.g. FIG. 2).

The storage 937 can have a hard disk, a solid state drive and the like. It can be used to store local measurement data like the measurement events $y_1, y_2 \ldots, y_n$ obtained from the event-based imaging sensor, or to store calculation data like the observed filter response Y(t) or the reconstructed spectral scene X*.

The communication interface 938 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 930. Alternative configurations may be implemented with additional or other sensors, storage devices, interfaces or the like. For example, the communication interface 938 may support other radio access technologies than the mentioned WLAN, GSM, UMTS and LTE. Also there could be multiple event-based imaging sensors, etc.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

It should also be noted that the division of the control or circuitry of FIG. 13 into units 931 to 940 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

[1] An apparatus comprising
a spectral filter (26) with a variable spectral filter transmission (FT($\lambda$));
an event-based imaging sensor (27) configured to produce measurement events ($y_1, y_2, \ldots, y_n$) which correspond to a change in a filter response (Y(t)) that is generated by an observed spectrum (X($\lambda$)), and
a processor (28) configured to
control the filter transmission (FT($\lambda$)) of the spectral filter (26) so that it sweeps over wavelength ($\lambda$) with time (t), and to
generate an estimation (X*($\lambda$)) of the observed spectrum (X($\lambda$)) based on the measurement events ($y_1, y_2, \ldots, y_n$) that correspond to the filter response (Y(t)) and based on the filter transmission (FT($\lambda$)).

[2] The apparatus of [1], in which the processor (28) is configured to control the spectral filter transmission (FT($\lambda$)) of the spectral filter (26) so that it sweeps linearly or non-linearly over wavelength ($\lambda$) with time (t).

[3] The apparatus of [1] or [2], wherein the event-based imaging sensor (27) is configured to create the filter response (Y(t)) by recording any intensity changes that result from changes in the spectral filter transmission (FT(t)).

[4] The apparatus of anyone of [1] to [3], wherein the event-based imaging sensor (27) is configured to register pixel intensity changes in an asynchronous way.

[5] The apparatus of anyone of [1] to [4], wherein the event-based imaging sensor (27) is configured to create, from incidents on the imaging sensor, events ($y_1, \ldots, y_N$) that indicate an intensity increase or decrease.

[6] The apparatus of [5], wherein the events ($y_1$ to $y_N$) indicate an intensity increase or decrease of a pre-defined threshold ($\lambda$) which is fixed or adaptively changed by the processor (28).

[7] The apparatus of [5] or [6], wherein the processor (28) is configured to create the filter response (Y(t)) from the detected events ($y_1, \ldots, y_N$).

[8] The apparatus of [7], wherein the processor (28) is configured to reconstruct the observed spectrum (X($\lambda$)) from the measured filter responses (Y(t)) by a numerical reconstruction method.

[9] The apparatus of [8], wherein the numerical reconstruction method is a Tikhonov regularization.

[10] The apparatus of [9], wherein the numerical reconstruction method is based on a matrix containing the known filter responses of the spectral filter.

[11] The apparatus of anyone of [8] to [10], wherein in the numerical reconstruction method, a single event ($y_m$) or a sum of events related to a measurement between a time interval ([$t_0, t_1$]) is formulated as a linear or higher order combination.

[12] The apparatus of [11], wherein the linear or higher order combination is $y_m = [FS(t_1) - FS(t_0)] \cdot x \cdot (t_1 - t_0)$, where FS is the filter transmission of the spectral filter, x is the observed spectrum and ($t_1 - t_0$) is the time interval.

[13] The apparatus of anyone of [8] to [12], wherein the numerical reconstruction method is based on compressive sensing (CS) principles.

[14] The apparatus of anyone of [1] to [13], further comprising a lens system (24) and a band-limiting filter (25).

[15] A method, comprising
producing measurement events ($y_1, y_2, \ldots, y_n$) which correspond to a change in a filter response (Y(t)) of a spectral filter (26) that is generated by an observed spectrum (X($\lambda$));
controlling the filter transmission (FT($\lambda$)) of the spectral filter (26) so that it sweeps over wavelength ($\lambda$) with time (t); and
generating an estimation (X*($\lambda$)) of the observed spectrum (X($\lambda$)) based on the measurement events ($y_1, y_2, \ldots, y_n$) that correspond to the filter response (Y(t)) and based on the filter transmission (FT($\lambda$)).

[16] A computer program comprising instructions, the instructions when carried out on a processor cause the processor to
produce measurement events ($y_1, y_2, \ldots, y_n$) which correspond to a change in a filter response (Y(t)) of a spectral filter (26) that is generated by an observed spectrum (X($\lambda$));
control the filter transmission (FT($\lambda$)) of the spectral filter (26) so that it sweeps over wavelength ($\lambda$) with time (t); and
generate an estimation (X*($\lambda$)) of the observed spectrum (X($\lambda$)) based on the measurement events ($y_1, y_2, \ldots, y_n$) that correspond to the filter response (Y(t)) and based on the filter transmission (FT($\lambda$)).

[17] A computer-readable medium comprising instructions, the instructions when carried out on a processor cause the processor to
produce measurement events ($y_1, y_2, \ldots, y_n$) which correspond to a change in a filter response (Y(t)) of a spectral filter (26) that is generated by an observed spectrum (X($\lambda$));
control the filter transmission (FT($\lambda$)) of the spectral filter (26) so that it sweeps over wavelength ($\lambda$) with time (t); and
generate an estimation (X*($\lambda$)) of the observed spectrum (X($\lambda$)) based on the measurement events ($y_1, y_2, \ldots, y_n$) that correspond to the filter response (Y(t)) and based on the filter transmission (FT($\lambda$)).

The invention claimed is:
1. An apparatus comprising
a spectral filter with a variable spectral filter transmission;
an event-based imaging sensor configured to produce measurement events which correspond to a change in a filter response that is generated by an observed spectrum, and
a processor configured to
control the filter transmission of the spectral filter so that it sweeps over wavelength with time, and to
generate an estimation of the observed spectrum based on the measurement events that correspond to the filter response and based on the filter transmission.

2. The apparatus of claim 1, in which the processor is configured to control the spectral filter transmission of the spectral filter so that it sweeps linearly or non-linearly over wavelength with time.

3. The apparatus of claim 1, wherein the event-based imaging sensor is configured to create the filter response by recording any intensity changes that result from changes in the spectral filter transmission.

4. The apparatus of claim 1, wherein the event-based imaging sensor is configured to register pixel intensity changes in an asynchronous way.

5. The apparatus of claim 1, wherein the event-based imaging sensor is configured to create, from incidents on the imaging sensor, events that indicate an intensity increase or decrease.

6. The apparatus of claim 5, wherein the events indicate an intensity increase or decrease of a pre-defined threshold which is fixed or adaptively changed by the processor.

7. The apparatus of claim 5, wherein the processor is configured to create the filter response from the detected events.

8. The apparatus of claim 7, wherein the processor is configured to reconstruct the observed spectrum from the measured filter responses by a numerical reconstruction method.

9. The apparatus of claim 8, wherein the numerical reconstruction method is a Tikhonov regularization.

10. The apparatus of claim 9, wherein the numerical reconstruction method is based on a matrix containing the known filter responses of the spectral filter.

11. The apparatus of claim 8, wherein in the numerical reconstruction method, a single event or a sum of events related to a measurement between a time interval is formulated as a linear or higher order combination.

12. The apparatus of claim 11, wherein the linear or higher order combination is $y_m = [FS(t_1) - FS(t_0)] \cdot x \cdot (t_1 - t_0)$, where FS is the filter transmission of the spectral filter, x is the observed spectrum and $(t_1 - t_0)$ is the time interval.

13. The apparatus of claim 8, wherein the numerical reconstruction method is based on compressive sensing principles.

14. The apparatus of claim 1, further comprising a lens system and a band-limiting filter.

15. A method, comprising
producing measurement events which correspond to a change in a filter response of a spectral filter that is generated by an observed spectrum;
controlling the filter transmission of the spectral filter so that it sweeps over wavelength with time; and
generating an estimation of the observed spectrum based on the measurement events that correspond to the filter response and based on the filter transmission.

* * * * *